US009892332B1

(12) United States Patent
Wendel et al.

(10) Patent No.: US 9,892,332 B1
(45) Date of Patent: Feb. 13, 2018

(54) VISION-BASED DETECTION AND CLASSIFICATION OF TRAFFIC LIGHTS

(71) Applicant: Waymo LLC, Mountain View, CA (US)

(72) Inventors: Andreas Wendel, Mountain View, CA (US); David Ian Franklin Ferguson, Mountain View, CA (US)

(73) Assignee: Waymo LLC, Mountain View, CA (US)

(*) Notice: Subject to any disclaimer, the term of this patent is extended or adjusted under 35 U.S.C. 154(b) by 0 days.

(21) Appl. No.: 15/682,963

(22) Filed: Aug. 22, 2017

Related U.S. Application Data

(63) Continuation of application No. 14/538,669, filed on Nov. 11, 2014, now Pat. No. 9,779,314.

(60) Provisional application No. 62/040,083, filed on Aug. 21, 2014.

(51) Int. Cl.
   *G06K 9/00* (2006.01)
   *B60W 30/00* (2006.01)
   *G06K 9/66* (2006.01)

(52) U.S. Cl.
   CPC ......... *G06K 9/00825* (2013.01); *B60W 30/00* (2013.01); *G06K 9/66* (2013.01)

(58) Field of Classification Search
   CPC ...... G06K 9/00825; G06K 9/66; B60W 30/00
   See application file for complete search history.

(56) References Cited

U.S. PATENT DOCUMENTS

| 8,031,062 B2 | 10/2011 | Smith |
| 8,751,154 B2 | 6/2014 | Zhang et al. |
| 8,761,991 B1 | 6/2014 | Ferguson et al. |
| 9,442,487 B1 * | 9/2016 | Ferguson ............. G08G 1/0104 |

(Continued)

FOREIGN PATENT DOCUMENTS

WO    2014078979 A1    5/2014

OTHER PUBLICATIONS

De Charette, Raoul, and Fawzi Nashashibi. "Traffic light recognition using image processing compared to learning processes." Intelligent Robots and Systems, 2009. IROS 2009. IEEE/RSJ International Conference on. IEEE, 2009.*

(Continued)

*Primary Examiner* — Jonathan S Lee
(74) *Attorney, Agent, or Firm* — McDonnell Boehnen Hulbert & Berghoff LLP

(57) ABSTRACT

The present disclosure is directed to an autonomous vehicle having a vehicle control system. The vehicle control system includes an image processing system. The image processing system receives an image that includes a plurality of image portions. The image processing system also calculates a score for each image portion. The score indicates a level of confidence that a given image portion represents an illuminated component of a traffic light. The image processing system further identifies one or more candidate portions from among the plurality of image portions. Additionally, the image processing system determines that a particular candidate portion represents an illuminated component of a traffic light using a classifier. Further, the image processing system provides instructions to control the autonomous vehicle based on the particular candidate portion representing an illuminated component of a traffic light.

20 Claims, 8 Drawing Sheets

(56) References Cited

U.S. PATENT DOCUMENTS

| | | | |
|---|---|---|---|
| 9,690,297 B1* | 6/2017 | Ferguson | G05D 1/0246 |
| 9,690,997 B2* | 6/2017 | Murao | G06K 9/00825 |
| 9,779,314 B1 | 10/2017 | Wendel et al. | |
| 2012/0288156 A1* | 11/2012 | Kido | H04N 9/73 382/104 |
| 2013/0211682 A1 | 8/2013 | Joshi | |
| 2014/0226349 A1* | 8/2014 | Morishita | G06K 9/00825 362/466 |
| 2015/0138324 A1* | 5/2015 | Shirai | B60Q 1/143 348/47 |
| 2015/0332104 A1* | 11/2015 | Kapach | G06K 9/6215 382/104 |
| 2016/0267334 A1* | 9/2016 | Ferguson | G06K 9/00791 |

OTHER PUBLICATIONS

Kim, Hyun-Koo, Ju H. Park, and Ho-Youl Jung. "Effective traffic lights recognition method for real time driving assistance system in the daytime." World Academy of Science, Engineering and Technology 59th (2011).*

Fairfield, Nathaniel, and Chris Urmson. "Traffic light mapping and detection." Robotics and Automation (ICRA), 2011 IEEE International Conference on. IEEE, 2011.*

Zong, Wenhao, and Qijun Chen. "Traffic Light Detection Based on Multi-feature Segmentation and Online Selecting Scheme." Systems, Man and Cybernetics (SMC), 2014 IEEE International Conference on. IEEE, 2014.*

Chiu, Yi-Tung, Duan-Yu Chen, and Jun-Wei Hsieh. "Real-time traffic light detection on resource-limited mobile platform." Consumer Electronics-Taiwan (ICCE-TW), 2014 IEEE International Conference on. IEEE, 2014.*

Levinson, Jesse, et al. "Traffic light mapping, localization, and state detection for autonomous vehicles." Robotics and Automation (ICRA), 2011 IEEE International Conference on. IEEE, 2011.*

Diaz-Cabrera et al., "Suspended traffic lights detection and distance estimation using color features," 15th International IEEE Conference on Intelligent Transportation Systems, IEEE, 2012.

Gong et al., "The recognition and tracking of traffic lights based on color segmentation and camshift for intelligent vehicles," Intelligent Vehicles Symposium, IEEE, 2010.

Ying Jie et al., "A New Traffic Light Detection and Recognition Algorithm for Electronic Travel Aid," Fourth International Conference on Intelligent Control and Information Processing (ICICIP), IEEE, 2013.

John et al., "Traffic light recognition in varying illumination using deep learning and saliency map," 7th International Conference on Intelligent Transportation Systems (ITSC), IEEE, 2014.

* cited by examiner

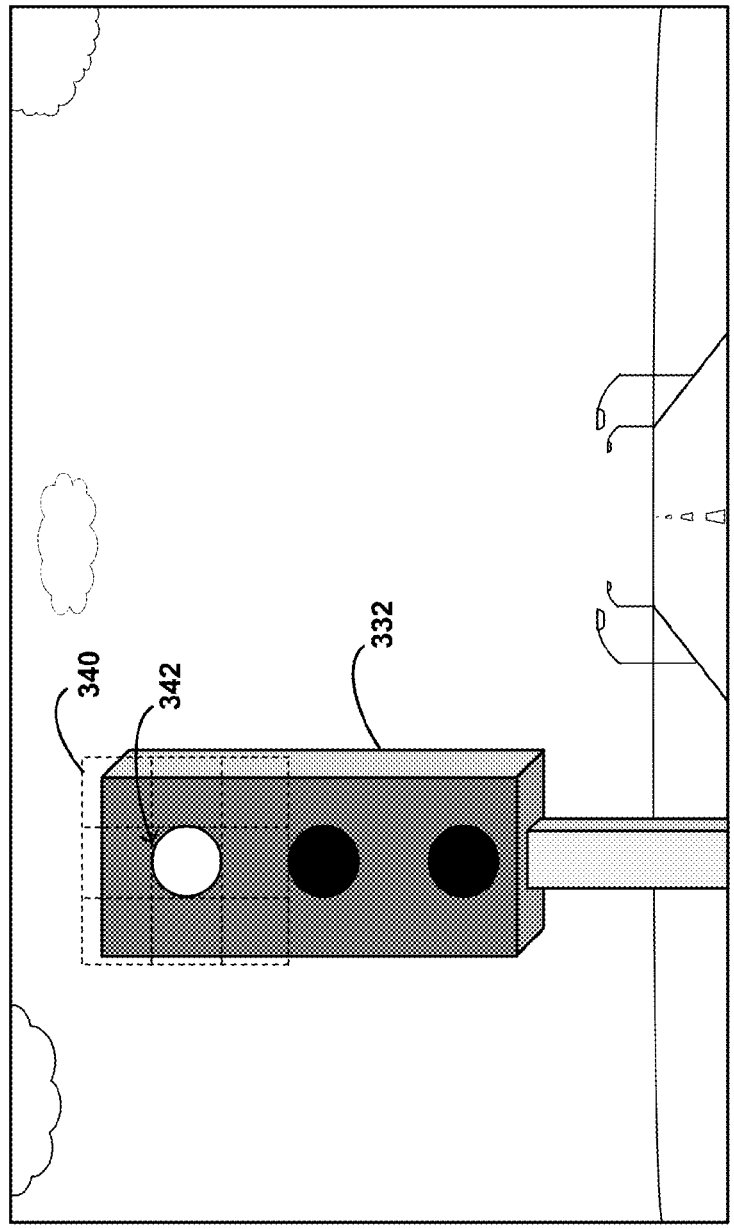

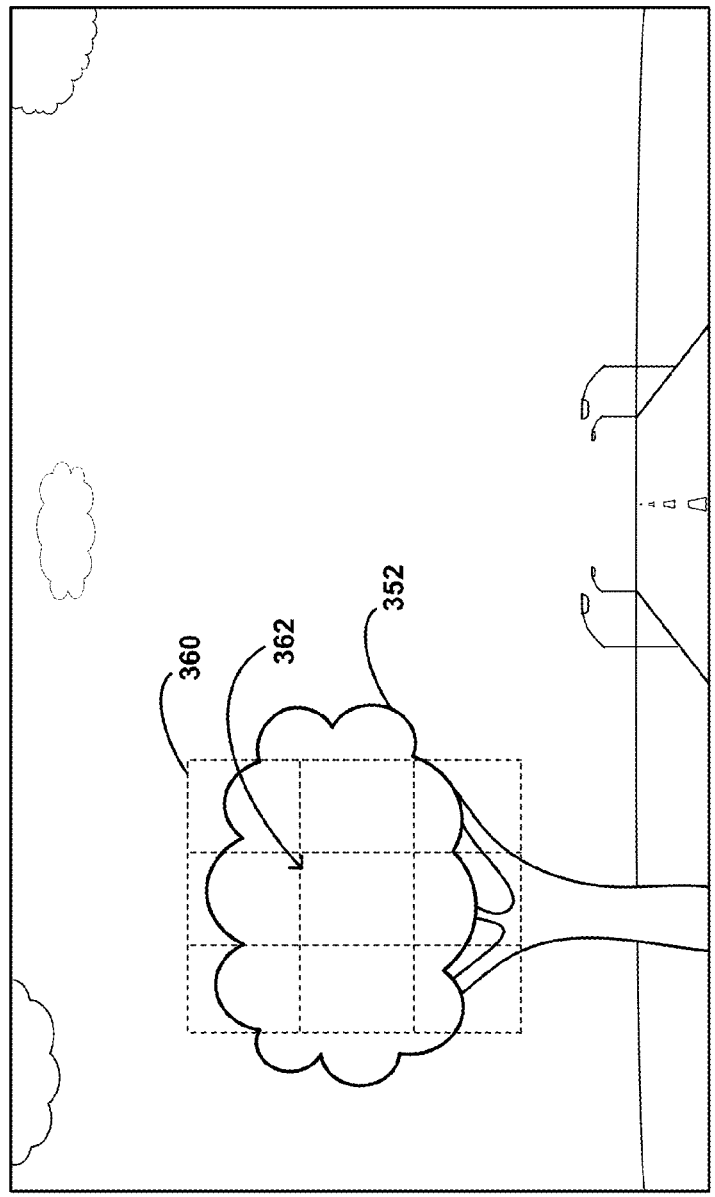

COMPUTER PROGRAM PRODUCT 500

SIGNAL BEARING MEDIUM 501

PROGRAM INSTRUCTIONS 502

- RECEIVE AN IMAGE THAT INCLUDES A PLURALITY OF IMAGE PORTIONS
- CALCULATE SCORES FOR GIVEN IMAGE PORTIONS
- IDENTIFY ONE OR MORE CANDIDATE PORTIONS
- DETERMINE THAT A PARTICULAR CANDIDATE PORTION REPRESENTS AN ILLUMINATED COMPONENT OF A TRAFFIC LIGHT
- PROVIDE INSTRUCTIONS TO CONTROL THE AUTONOMOUS VEHICLE BASED ON THE PARTICULAR CANDIDATE PORTION REPRESENTING AN ILLUMINATED COMPONENT OF A TRAFFIC LIGHT

| COMPUTER READABLE MEDIUM 503 | COMPUTER RECORDABLE MEDIUM 504 | COMMUNICATIONS MEDIUM 505 |

FIG. 5

VISION-BASED DETECTION AND CLASSIFICATION OF TRAFFIC LIGHTS

CROSS-REFERENCE TO RELATED APPLICATIONS

This application claims is a continuation of U.S. patent application Ser. No. 14/538,669, filed Nov. 11, 2014, which claims priority to U.S. Provisional Patent Application Ser. No. 62/040,083 filed Aug. 21, 2014. The foregoing applications are incorporated herein by reference.

BACKGROUND

Unless otherwise indicated herein, the materials described in this section are not prior art to the claims in this application and are not admitted to be prior art by inclusion in this section.

A vehicle could be any wheeled, powered vehicle and may include a car, truck, motorcycle, bus, etc. Vehicles can be utilized for various tasks such as transportation of people and goods, as well as many other uses.

Some vehicles may be partially or fully autonomous. For instance, when a vehicle is in an autonomous mode, some or all of the driving aspects of vehicle operation can be handled by a vehicle control system. In such cases, computing devices located onboard and/or in a server network could be operable to carry out functions such as planning a driving route, sensing aspects of the vehicle, sensing the environment of the vehicle, and controlling drive components such as steering, throttle, and brake. Thus, autonomous vehicles may reduce or eliminate the need for human interaction in various aspects of vehicle operation.

SUMMARY

The present application discloses embodiments that relate to detection of traffic lights and other traffic indicators in images or videos captured by an image-capture device coupled to an autonomous vehicle. In one aspect, the present application describes a method. The method includes receiving, from the image-capture device coupled to the autonomous vehicle, an image of a field of view of the autonomous vehicle. The image includes a plurality of image portions. The method also includes calculating a score for each image portion. A given score indicates a level of confidence that the given image portion represents an illuminated component of a traffic light. The method further includes identifying, from among the plurality of image portions, one or more candidate portions as image portions having a score exceeding a threshold level of confidence. Additionally, the method includes determining that a particular candidate portion represents an illuminated component of a traffic light using a classifier. The classifier has been trained using training data indicative of a plurality of example images that include traffic lights and a plurality of example images that do not include traffic lights. Further, the method includes providing instructions executable by a computing device to control the autonomous vehicle.

In another aspect, the present application describes an image processing system. The image processing system includes an image-capture device, at least one processor, and a memory. The memory has stored thereon instructions that, upon execution by the at least one processor, cause the control system to perform functions. The functions include receiving, from the image-capture device coupled to an autonomous vehicle, an image of a field of view of the autonomous vehicle. The image includes a plurality of image portions. The functions also include calculating a score for each image portion. A given score indicates a level of confidence that the given image portion represents an illuminated component of a traffic light. The functions further include identifying, from among the plurality of image portions, one or more candidate portions as image portions having a score exceeding a threshold level of confidence. Additionally, the functions include determining that the particular candidate portion represents an illuminated component of a traffic light based on training data indicative of a plurality of example images that include traffic lights and a plurality of example images that do not include traffic lights. Further, the functions include providing executable instructions to control the autonomous vehicle based on the particular candidate portion representing an illuminated component of a traffic light.

In yet another aspect, the present disclosure describes a non-transitory computer readable medium having stored thereon instructions that, upon execution by at least one processor of a computing device, cause the computing device to perform functions. The functions include receiving, from an image-capture device coupled to an autonomous vehicle, an image of a field of view of the autonomous vehicle. The image includes a plurality of image portions. The functions also include calculating a score for each image portion. A given score indicates a level of confidence that the given image portion represents an illuminated component of a traffic light. The functions further include identifying, from among the plurality of image portions, one or more candidate portions as image portions having a score exceeding a threshold level of confidence. Additionally, the functions include determining that a particular candidate portion represents an illuminated component of a traffic light using a classifier. The classifier has been trained using training data indicative of a plurality of example images that include traffic lights and a plurality of example images that do not include traffic lights. Further, the functions include providing instructions executable by the computing device to control the autonomous vehicle based on the particular candidate portion representing an illuminated component of a traffic light.

In another aspect, the present application describes a system. The system includes a means for receiving, from an image-capture device coupled to the autonomous vehicle, an image of a field of view of the autonomous vehicle. The image includes a plurality of image portions. The system also includes a means for calculating a score for each image portion. A given score indicates a level of confidence that the given image portion represents an illuminated component of a traffic light. The system further includes a means for identifying, from among the plurality of image portions, one or more candidate portions as image portions having a score exceeding a threshold level of confidence. Additionally, the system includes a means for determining that a particular candidate portion represents an illuminated component of a traffic light using a classifier. The classifier has been trained using training data indicative of a plurality of example images that include traffic lights and a plurality of example images that do not include traffic lights. Further, the system includes a means for providing instructions executable by a computing device to control the autonomous vehicle.

The foregoing summary is illustrative only and is not intended to be in any way limiting. In addition to the illustrative aspects, embodiments, and features described

BRIEF DESCRIPTION OF THE FIGURES

FIG. 3C illustrates another example image including a traffic light.

FIG. 3D illustrates an example image without a traffic light.

FIG. 5 illustrates an example computer readable medium.

DETAILED DESCRIPTION

Figure 1:
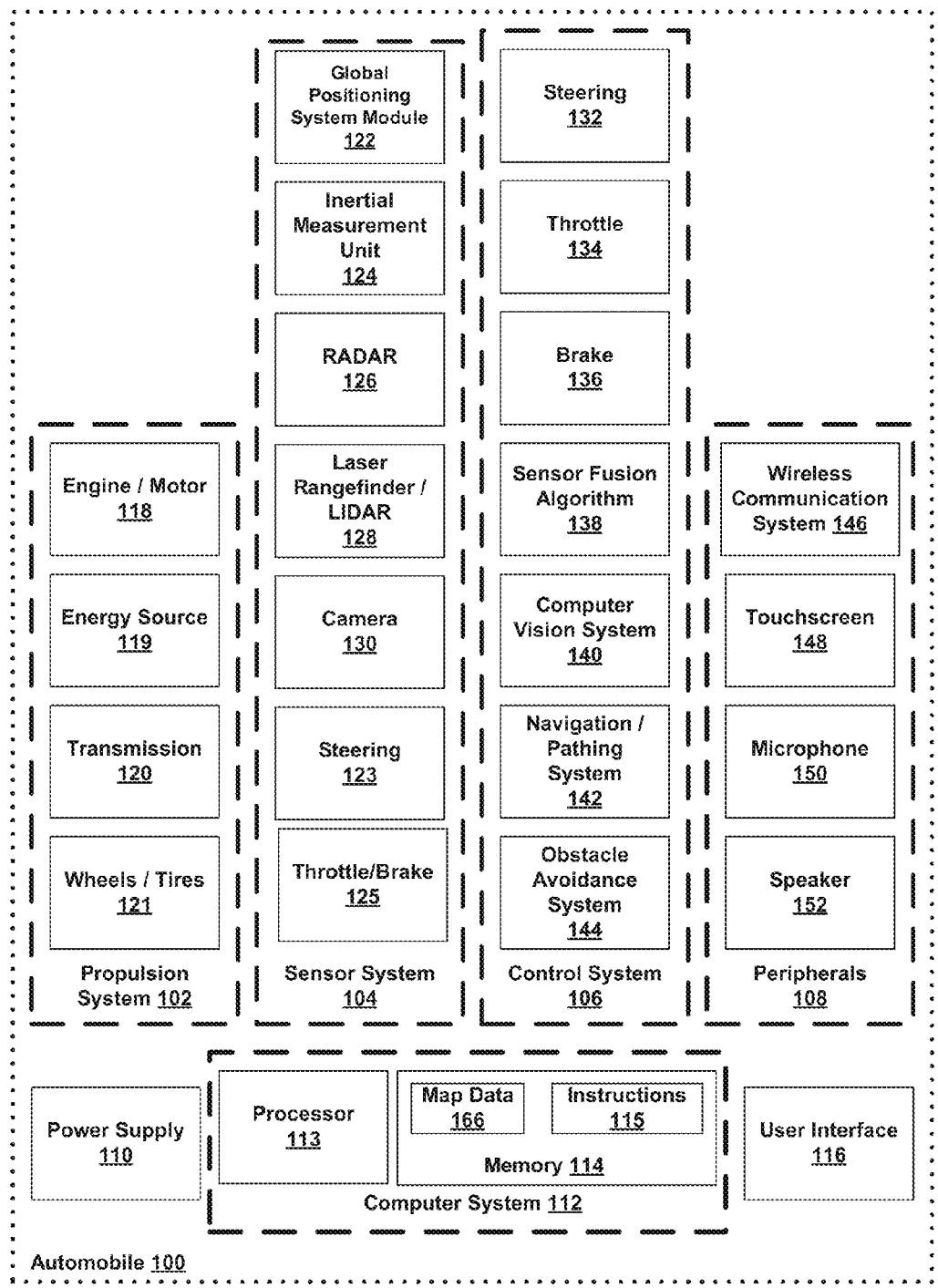
FIG. 1 is a functional block diagram illustrating a vehicle, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

An example embodiment involves an autonomous vehicle configured with an imaging system. The imaging system may include a camera configured to capture images, video, or both images and video. The captured images and video are stored in a memory for processing. Some or all of the captured images may be forward-facing images of a field of view of the vehicle. For example, some of the images captured by the imaging system may resemble the view a driver of the vehicle may see as the driver operates the vehicle. Additional images may capture side and rear views from the vehicle as well.

A processing system in the autonomous vehicle is configured to detect and classify traffic lights, other light indicators, or other traffic indicators (such as road signs) associated with directing traffic flow of vehicles and pedestrians in the captured images and videos. The processing system is also configured to determine attributes of the detected traffic lights or other traffic indicators, such as the color and shape of an illuminated portion of the traffic light. Other attributes, such as the shape of a traffic indicator and text or symbols on a traffic indicator may also be determined by the processing system. The processing system may identify a number of portions from a given image as candidate image portions that may or may not represent a traffic light, light indicator, or other traffic indicator. The processing system may then classify each of the candidate image portions as a traffic light in a particular state. In some cases, the processing system may determine candidate image portions as containing something other than a traffic light or other traffic indicator. The processing system may provide instructions to control the autonomous vehicle based on any identified traffic lights and their determined states.

The processing system may calculate a score for each of the image portions indicative of a level of confidence that the image portion represents an illuminated component of a traffic light. In some cases, the processing system calculates separate sub-scores for the center of the image portion and an outer area that extends from the edge of the center area to the edge of the image portion. In some embodiments, the processing system subtracts the sub-score of the outer area from the sub-score of the center to determine the score of a particular image portion. The processing system may assign a value to each pixel corresponding to the colors of the pixels, where certain colors are associated with higher values compared to other colors.

In some examples, a particular image portion contains a traffic light having an illuminated component having a particular color and shape surrounded by a different color, such as black or white. In these examples, the processing system may determine the center of the particular image portion containing the illuminated component of the traffic light to have a high sub-score as a result of the color of the illuminated component, and the outer area containing the housing that encloses the illuminated component to have a low sub-score as a result of the color of the housing. Accordingly, the processing system may determine the particular image portion to have a high score based on a large magnitude difference between the low sub-score and the high sub-score.

In other examples, a particular image portion contains an object—such as a tree or billboard, among other objects—having a similar color to a color of an illuminated component of a traffic light. In these examples, the processing system may determine the center of the particular image portion containing the center of the object to have a high sub-score, and the outer area containing the outer area of the object to also have a high sub-score. As a result, the processing system may determine that the particular image portion containing the object to have a low score based on a low magnitude difference between the two high sub-scores.

The processing system determines a particular image portion as a candidate image portion if the particular image portion's score exceeds a threshold value. A candidate image portion is an image portion that is potentially representative of an illuminated component of a traffic light. The threshold value may be adjusted in order to produce more or fewer candidate image portions. Then, the processing system determines whether the candidate portions represent illuminated components of traffic lights using a classifier. The classifier may also identify attributes of the illuminated component of a traffic light, such as its color and shape.

A classifier may be any supervised machine-learning tool configured to identify one or more categories to which an image portion belongs. The one or more categories may include states of traffic lights, such as "solid red light" or "green left arrow," among other examples. Some example supervised machine-learning tools include decision trees, support vector machines (SVMs), and boosting, among others. A processing system may determine attributes from an image portion, and a classifier that utilizes a decision tree may map the determined attributes to one or more categories. An attribute may be any quantifiable property or feature of an image portion that differentiates the category of the image portion from other categories. Similarly, an SVM may associate particular attribute value ranges with one or more categories, and the processing system may provide the attribute values to the SVM to classify the image portion. The processing system may also use other example supervised machine-learning tools.

The classifier may be trained using training data that associates certain attributes with certain categories. In some instances, a set of example image portions of the same category is provided to the classifier in order to determine a range of attribute values to associate with that particular attribute. This process may be referred to herein as "training the classifier." Other sets of example image portions may be provided in order to train the classifier to identify a plurality of categories. As a specific example, the classifier may be supplied with a set of images indicative of solid red lights and another set of images indicative of green left arrows. The classifier may identify a range of attribute values associated with solid red lights and another range of attribute values associated with green left arrows. Then, if the processing system provides an image portion to the classifier and the classifier determines that the image portion's attribute value is within the range of attribute values associated with solid red lights, the classifier identifies that the provided image portion contains a solid red light.

In some embodiments, the classifier is trained using positive examples and negative examples. A positive example associates a particular attribute value corresponding to with an example image with a particular category. In contrast, a negative example dissociates a certain attribute value corresponding to another example image with the particular category. In some cases, one or more of the negative examples may be images that do not include traffic lights. Accordingly, a classifier may be trained with example images of traffic lights in particular states and with example images that do not contain traffic lights, among other example images. By training the classifier with positive and negative examples, the classifier may identify more accurate ranges of attribute values to associate with a particular category. As a specific example, the classifier may be trained with positive example images containing solid red lights and negative example images not containing solid red lights. The classifier may identify a positive range of attribute values to associate with solid red lights based on the positive example images. The classifier may then identify a negative range of attribute values that are dissociated with solid red lights based on the negative examples. The negative examples may include images that represent traffic lights in other states and/or images that do not contain any traffic lights. The classifier may utilize the positive range of attribute values and the negative range of attribute values when determining a category to associate with a particular image portion.

It should be noted that the preceding examples only discuss a few of the states of traffic lights that can be identified; a classifier may be trained to identify other states of traffic lights, included various colors, shapes, and lighting patterns. Further, the range of attribute values described above may be in any number of dimensions, so that multiple attribute values may be considered when mapping an image portion to a particular category.

In some cases, the processing system may calculate sub-scores in a manner similar to the previously described examples in order to determine whether or not an object in an image is a traffic light. In some embodiments, the score may be determined using the colors as described above. In some examples, an image containing a traffic light might be taken from below the traffic light, such that the traffic light is surrounded by the sky, and the processing system may perform similar color analysis techniques to those described above in order to determine that the image contains a traffic light. In other embodiments, the score may be determined using other image classification techniques by comparing the center area and the outer area to example images of traffic lights.

In some embodiments, the processing system receives data indicating locations of traffic lights. In some cases, the processing system may determine an image patch—or a section of the image—to process based on the received traffic light location data, so as to potentially reduce the number of candidate portions to be processed.

In certain weather and lighting conditions, colors in a captured image may be more difficult to distinguish from one another. Depending on the certain environmental conditions that affect a captured image, the processing system may calculate scores for image portions that are, compared to images captured in more ideal environmental conditions, lower as a result of images captured in poorer lighting conditions. In order to ensure that the image portions containing traffic lights are identified as candidate portions, the threshold level of confidence may be adjusted to increase the number of candidate portions that the processing system identifies. Thus, even though various environmental conditions may adversely affect images captured by the image-capture device, the processing system may be able to identify traffic lights under various conditions and provide instructions to more safely control the vehicle.

A control system of the vehicle may responsively adjust the vehicle control when traffic lights, other light indicators, or other traffic indicators are detected in the captured image. For example, the control system may alter a course of the vehicle and/or alter a speed of the vehicle in response to detecting a traffic light in a particular state. Additionally, the control system may record the position of a traffic light detected in the image.

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100, according to an example embodiment. The vehicle 100 could be configured to operate fully or partially in an autonomous mode. For example, a computer system could control the vehicle 100 while in the autonomous mode, and may be operable to capture an image with a camera in vehicle 100, analyze the image for the presence of a turn signal indicator, and responsively control vehicle 100 based on the presence of the turn signal indicator. While in autonomous mode, the vehicle 100 may be configured to operate without human interaction.

The vehicle 100 could include various subsystems such as a propulsion system 102, a sensor system 104, a control system 106, one or more peripherals 108, as well as a power supply 110, a computer system 112, a data storage 114, and a user interface 116. The vehicle 100 may include more or fewer subsystems and each subsystem could include multiple elements. Further, each of the subsystems and elements of vehicle 100 could be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion for the vehicle 100. Depending upon the embodiment, the propulsion system 102 could include an engine/motor 118, an energy source 119, a transmission 120, and wheels/tires 121. The engine/motor 118 could be any combination of an internal combustion engine, an electric motor, steam engine, Stirling engine. Other motors and/or engines are possible. In some embodiments, the engine/motor 118 may be configured to convert energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. Examples of energy sources 119 contemplated within the scope of the present disclosure include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 119 could also provide energy for other systems of the vehicle 100.

The transmission 120 could include elements that are operable to transmit mechanical power from the engine/motor 118 to the wheels/tires 121. The transmission 120 could include a gearbox, a clutch, a differential, and a drive shaft. Other components of transmission 120 are possible. The drive shafts could include one or more axles that could be coupled to the one or more wheels/tires 121.

The wheels/tires 121 of vehicle 100 could be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 could represent at least one wheel that is fixedly attached to the transmission 120 and at least one tire coupled to a rim of the wheel that could make contact with the driving surface. The wheels/tires 121 could include any combination of metal and rubber. Other materials are possible.

The sensor system 104 may include several elements such as a Global Positioning System (GPS) 122, an inertial measurement unit (IMU) 124, a radar 126, a laser rangefinder/LIDAR 128, a camera 130, a steering sensor 123, and a throttle/brake sensor 125. The sensor system 104 could also include other sensors, such as those that may monitor internal systems of the vehicle 100 (e.g., $O_2$ monitor, fuel gauge, engine oil temperature, brake wear).

The GPS 122 could include a transceiver operable to provide information regarding the position of the vehicle 100 with respect to the Earth. The IMU 124 could include a combination of accelerometers and gyroscopes and could represent any number of systems that sense position and orientation changes of a body based on inertial acceleration. Additionally, the IMU 124 may be able to detect a pitch and yaw of the vehicle 100. The pitch and yaw may be detected while the vehicle is stationary or in motion.

The radar 126 may represent a system that utilizes radio signals to sense objects, and in some cases their speed and heading, within the local environment of the vehicle 100. Additionally, the radar 126 may have a plurality of antennas configured to transmit and receive radio signals. The laser rangefinder/LIDAR 128 could include one or more laser sources, a laser scanner, and one or more detectors, among other system components. The laser rangefinder/LIDAR 128 could be configured to operate in a coherent mode (e.g., using heterodyne detection) or in an incoherent detection mode. The camera 130 could include one or more devices configured to capture a plurality of images of the environment of the vehicle 100. The camera 130 could be a still camera or a video camera.

The steering sensor 123 may represent a system that senses the steering angle of the vehicle 100. In some embodiments, the steering sensor 123 may measure the angle of the steering wheel itself. In other embodiments, the steering sensor 123 may measure an electrical signal representative of the angle of the steering wheel. Still, in further embodiments, the steering sensor 123 may measure an angle of the wheels of the vehicle 100. For instance, an angle of the wheels with respect to a forward axis of the vehicle 100 could be sensed. Additionally, in yet further embodiments, the steering sensor 123 may measure a combination (or a subset) of the angle of the steering wheel, electrical signal representing the angle of the steering wheel, and the angle of the wheels of vehicle 100.

The throttle/brake sensor 125 may represent a system that senses the position of either the throttle position or brake position of the vehicle 100. In some embodiments, separate sensors may measure the throttle position and brake position. In some embodiments, the throttle/brake sensor 125 may measure the angle of both the gas pedal (throttle) and brake pedal. In other embodiments, the throttle/brake sensor 125 may measure an electrical signal that could represent, for instance, an angle of a gas pedal (throttle) and/or an angle of a brake pedal. Still, in further embodiments, the throttle/brake sensor 125 may measure an angle of a throttle body of the vehicle 100. The throttle body may include part of the physical mechanism that provides modulation of the energy source 119 to the engine/motor 118 (e.g., a butterfly valve or carburetor). Additionally, the throttle/brake sensor 125 may measure a pressure of one or more brake pads on a rotor of vehicle 100. In yet further embodiments, the throttle/brake sensor 125 may measure a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, the throttle/brake sensor 125 could be configured to measure a pressure applied to a pedal of the vehicle, such as a throttle or brake pedal.

The control system 106 could include various elements include steering unit 132, throttle 134, brake unit 136, a sensor fusion algorithm 138, a computer vision system 140, a navigation/pathing system 142, and an obstacle avoidance system 144. The steering unit 132 could represent any combination of mechanisms that may be operable to adjust the heading of vehicle 100. The throttle 134 could control, for instance, the operating speed of the engine/motor 118 and thus control the speed of the vehicle 100. The brake unit 136 could be operable to decelerate the vehicle 100. The brake unit 136 could use friction to slow the wheels/tires 121. In other embodiments, the brake unit 136 could convert the kinetic energy of the wheels/tires 121 to electric current.

A sensor fusion algorithm 138 could include, for instance, a Kalman filter, Bayesian network, or other algorithm that may accept data from sensor system 104 as input. The sensor fusion algorithm 138 could provide various assessments based on the sensor data. Depending upon the embodiment, the assessments could include evaluations of individual objects and/or features, evaluation of a particular situation, and/or evaluate possible impacts based on the particular situation. Other assessments are possible.

The computer vision system 140 could include hardware and software operable to process and analyze images in an effort to determine objects, important environmental features (e.g., stop lights, road way boundaries, etc.), and obstacles. The computer vision system 140 could use object recognition, Structure From Motion (SFM), video tracking, and other algorithms used in computer vision, for instance, to recognize objects, map an environment, track objects, estimate the speed of objects, etc.

The navigation/pathing system 142 could be configured to determine a driving path for the vehicle 100. The navigation/pathing system 142 may additionally update the driving path dynamically while the vehicle 100 is in operation. In some embodiments, the navigation/pathing system 142 could incorporate data from the sensor fusion algorithm 138, the GPS 122, and known maps so as to determine the driving path for vehicle 100.

The obstacle avoidance system 144 could represent a control system configured to evaluate potential obstacles based on sensor data and control the vehicle 100 to avoid or otherwise negotiate the potential obstacles.

Various peripherals 108 could be included in vehicle 100. For example, peripherals 108 could include a wireless communication system 146, a touchscreen 148, a microphone 150, and/or a speaker 152. The peripherals 108 could provide, for instance, means for a user of the vehicle 100 to interact with the user interface 116. For example, the touchscreen 148 could provide information to a user of vehicle 100. The user interface 116 could also be operable to accept input from the user via the touchscreen 148. In other instances, the peripherals 108 may provide means for the vehicle 100 to communicate with devices within its environment.

In one example, the wireless communication system 146 could be configured to wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 could communicate with a wireless local area network (WLAN), for example, using WiFi. In some embodiments, wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communications (DSRC) devices that could include public and/or private data communications between vehicles and/or roadside stations.

The power supply 110 may provide power to various components of vehicle 100 and could represent, for example, a rechargeable lithium-ion or lead-acid battery. In an example embodiment, one or more banks of such batteries could be configured to provide electrical power. Other power supply materials and types are possible. Depending upon the embodiment, the power supply 110, and energy source 119 could be integrated into a single energy source, such as in some all-electric cars.

Many or all of the functions of vehicle 100 could be controlled by computer system 112. Computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway map data 166, path information, among other information. Such information may be used by vehicle 100 and computer system 112 during the operation of the vehicle 100 in the autonomous, semi-autonomous, and/or manual modes.

The vehicle 100 may include a user interface 116 for providing information to or receiving input from a user of vehicle 100. The user interface 116 could control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., propulsion system 102, sensor system 104, and control system 106), as well as from the user interface 116. For example, the computer system 112 may utilize input from the sensor system 104 in order to estimate the output produced by the propulsion system 102 and the control system 106. Depending upon the embodiment, the computer system 112 could be operable to monitor many aspects of the vehicle 100 and its subsystems. In some embodiments, the computer system 112 may disable some or all functions of the vehicle 100 based on signals received from sensor system 104.

The components of vehicle 100 could be configured to work in an interconnected fashion with other components within or outside their respective systems. For instance, in an example embodiment, the camera 130 could capture a plurality of images that could represent information about a state of an environment of the vehicle 100 operating in an autonomous mode. The state of the environment could include parameters of the road on which the vehicle is operating. For example, the computer vision system 140 may be able to recognize the slope (grade) or other features based on the plurality of images of a roadway. Additionally, the combination of Global Positioning System 122 and the features recognized by the computer vision system 140 may be used with map data 166 stored in the data storage 114 to determine specific road parameters. Further, the radar unit 126 may also provide information about the surroundings of the vehicle.

In other words, a combination of various sensors (which could be termed input-indication and output-indication sensors) and the computer system 112 could interact to provide an indication of an input provided to control a vehicle or an indication of the surroundings of a vehicle.

The computer system 112 could carry out several determinations based on the indications received from the input- and output-indication sensors. For example, the computer system 112 could calculate the direction (i.e. angle) and distance (i.e. range) to one or more objects that are reflecting radar signals back to the radar unit 126. Additionally, the computer system 112 could calculate a range of interest. The range of interest could, for example, correspond to a region where the computer system 112 has identified one or more targets of interest. Additionally or additionally, the computer system 112 may identify one or more undesirable targets. Thus, a range of interest may be calculated so as not to include undesirable targets.

In some embodiments, the computer system 112 may make a determination about various objects based on data that is provided by systems other than the radar system. For example, the vehicle may have lasers or other optical sensors configured to sense objects in a field of view of the vehicle. The computer system 112 may use the outputs from the various sensors to determine information about objects in a field of view of the vehicle. The computer system 112 may determine distance and direction information to the various objects. The computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 could be communicatively coupled together in a wired and/or wireless fashion.

Figure 2:
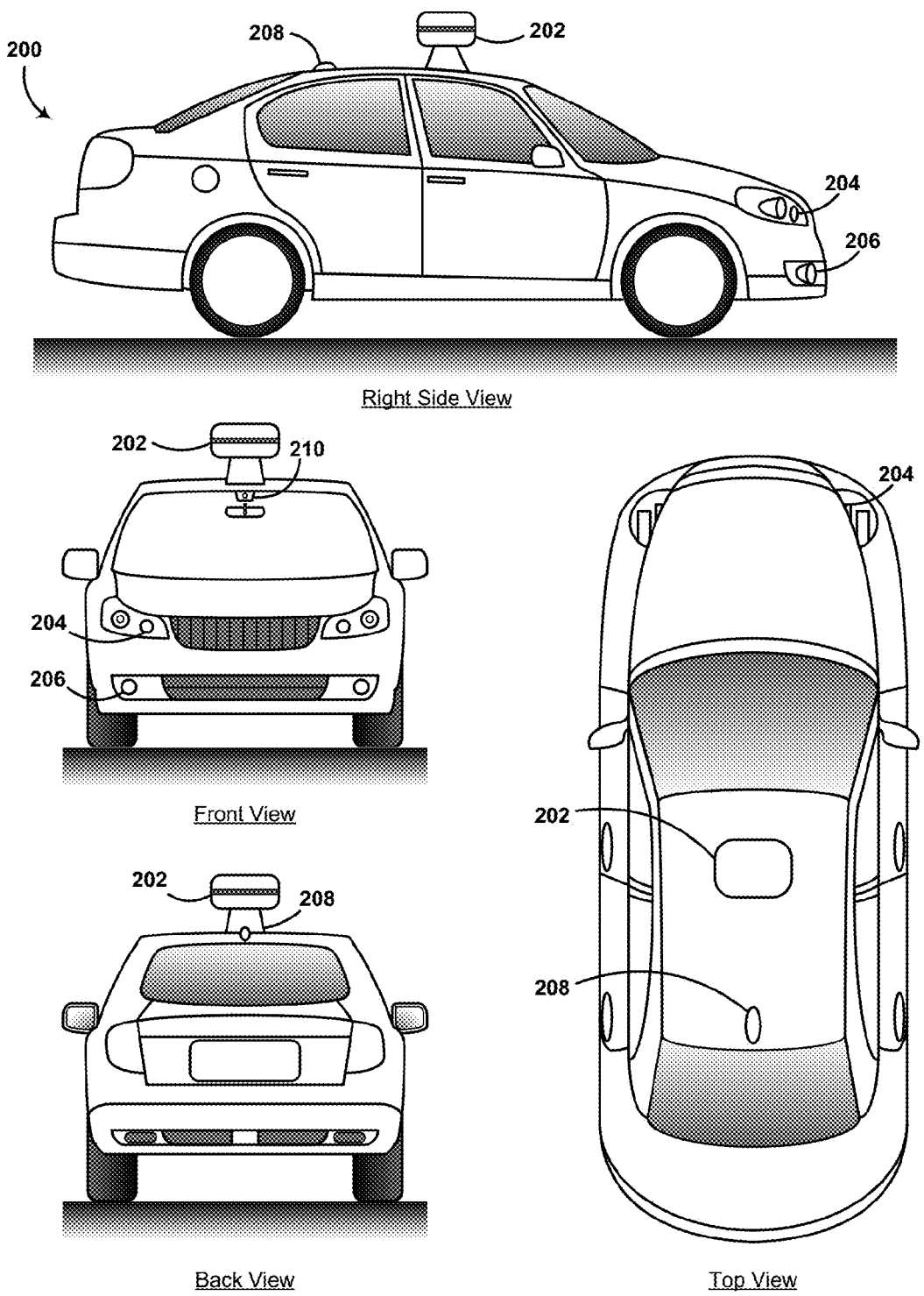
FIG. 2 shows a vehicle, according to an example embodiment.

FIG. 2 shows a vehicle 200 that could be similar or identical to vehicle 100 described in reference to FIG. 1. Depending on the embodiment, vehicle 200 could include a sensor unit 202, a wireless communication system 208, a radar 206, a laser rangefinder 204, and a camera 210. The elements of vehicle 200 could include some or all of the elements described for FIG. 1. Although vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

The sensor unit 202 could include one or more different sensors configured to capture information about an environment of the vehicle 200. For example, sensor unit 202 could include any combination of cameras, radars, LIDARs, range finders, and acoustic sensors. Other types of sensors are possible. Depending on the embodiment, the sensor unit 202 could include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include radar 206 and laser rangefinder 204.

The wireless communication system 208 could be located as depicted in FIG. 2. Alternatively, the wireless communication system 208 could be located, fully or in part, elsewhere. The wireless communication system 208 may include wireless transmitters and receivers that could be configured to communicate with devices external or internal to the vehicle 200. Specifically, the wireless communication system 208 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 could be mounted inside a front windshield of the vehicle 200. The camera 210 could be configured to capture a plurality of images of the environment of the vehicle 200. Specifically, as illustrated, the camera 210 could capture images from a forward-looking view with respect to the vehicle 200. Other mounting locations and viewing angles of camera 210 are possible. The camera 210 could represent one or more visible light cameras. Alternatively or additionally, camera 210 could include infrared sensing capabilities. The camera 210 could have associated optics that could be operable to provide an adjustable field of view. Further, the camera 210 could be mounted to vehicle 200 with a movable mount that could be operable to vary a pointing angle of the camera 210.

Figure 3A:
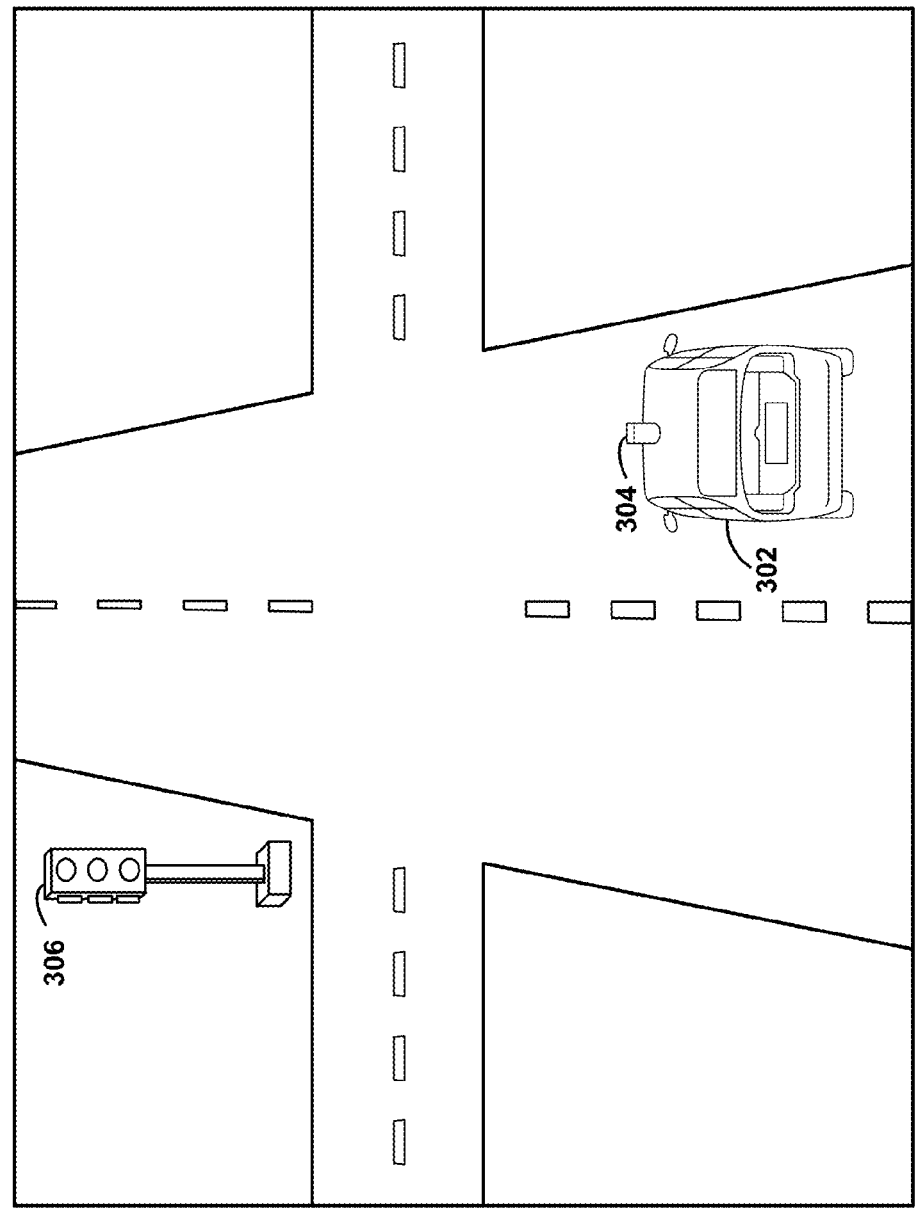
FIG. 3A illustrates an example scenario in which an example method may be carried out.

FIG. 3A illustrates an example scenario in which an example method may be carried out. The example scenario shown in FIG. 3A serves merely as an illustration and may vary in different scenarios. Similarly, other example situations or scenarios may exist as well. In the example scenario shown in FIG. 3A, a computing device associated with autonomous vehicle 302, whether in control or assisting the driver, may use one or more image-capture devices 304 to capture images of the surrounding environment of the vehicle. For example, the image-capture devices may be built into the grill or front dashboard of the vehicle and capture images of the space including objects within the front path of the vehicle. Similarly, the image-capture devices may be placed in various places on the vehicle and may be configured to capture different portions of the environment around the vehicle. The autonomous vehicle 302 in FIG. 3A may be similar or identical to vehicle 100 from FIG. 1 or vehicle 200 from FIG. 2. Components of vehicle 100 and vehicle 200 may also be included in the autonomous vehicle 302.

Although the computing device may be capable of determining objects, such as traffic lights, other light indicators, or traffic signs associated with directing traffic flow of vehicles and pedestrians, processing may require time and/or resources from the computing device or other devices. Thus, as discussed above, the computing device may use additional information received from other sources coupled to or associated with the vehicle, such as RADAR, LIDAR, other cameras, GPS, or other various sensors in order to process the image. The computing device may receive information about various characteristics of the objects or the environment surrounding the vehicle from other sources. Based on the information received from other sources, the computing device may process images received from the image-capture device. The computing device may be configured to use characteristics of an object to determine a portion of the image that includes the object for the computing device to analyze. For example, the computing device may use the assisted image processing to find the visual features within the image that reveal information about the object. For example, the computing device may use image processing to locate a traffic light from an image and identify characteristics of that traffic light. Similarly, the computing device may be configured to determine approximate locations of objects within the image based on information received from other sources coupled to the vehicle. For instance, the computing device may receive, or have stored on a memory, map data including geo-location information for roads, traffic signs, and traffic lights, among other data. In some embodiments, the computing device may utilize the map data in order to determine the approximate locations of objects in an image.

In some examples, the computing device may receive information through a wired-connection or wirelessly from, for example, the wireless communication system 146. The wireless communication system may send and/or receive information that modifies aspects of the method of the present disclosure, such as various thresholds and machine-learning training data.

FIG. 3A illustrates a scenario 300 in which an example method may be performed to detect a traffic light. FIG. 3A depicts an autonomous vehicle 302 having attached thereon a camera 304 at an intersection and a traffic light 306 that controls the flow of traffic at the intersection. The camera 304 is configured to capture images or videos that may contain traffic lights or other traffic indicators. Although the intersection depicted is a four-way intersection, an autonomous vehicle 302 may perform the example method at or near a three-way intersection, traffic circle, or other road junction controlled by one or more traffic lights. Additionally, the traffic light 306 depicted in FIG. 3A has three lighting elements arranged vertically. The processing system of an autonomous vehicle may also process other traffic light fixtures having any number of lighting elements arranged in any orientation. Further, the traffic light depicted in FIG. 3A is connected to a pole on the ground in front of and to the left of the autonomous vehicle 302. However, in other example scenarios in which the example method may be performed, the traffic light may be suspended, mounted, or otherwise made visible in a variety of locations. Further, in some instances, the processing system may detect light indicators that convey information to pedestrians, and may additionally consider the pedestrian light indicators in providing instructions to control the vehicle. In other instances, the processing system may detect traffic indicators that indicate rules in which vehicles on the road must comply with, and may also consider the traffic indicators in providing instructions to control the vehicle. It should be understood that any combination of various traffic lights, pedestrian light indicators, traffic indicators, and intersection configurations might be present in other example scenarios in which the example method may be performed.

In some example scenarios, the autonomous vehicle 302 is stopped at an intersection, such as when the illuminated component of the traffic light is a color, such as red, that signals a vehicle to stop. In these example scenarios, the processing system performs the method of the present application to monitor the state of the traffic light. The processing system may classify the traffic light and determine the state of the traffic light periodically, so that instructions may be provided in response to a change of the state of the traffic light.

In other example scenarios, the autonomous vehicle 302 is in motion and is travelling toward an intersection at a particular speed. In these example scenarios, the processing system performs the method of the present application to classify the state of the traffic light as it approaches the intersection. Depending upon the classified state of the traffic light, the processing system may provide instructions to the control system of the autonomous vehicle that alters the vehicle's speed or direction. The particular speed in which the autonomous vehicle 302 is traveling may also be considered by the processing system in providing instructions to control the vehicle. As an example, the autonomous vehicle 302 may determine that the classified state of the traffic light is signaling traffic to stop, and the autonomous vehicle 302 may determine a distance from the intersection at which to begin decreasing the speed of the vehicle based on the vehicle's speed. Similarly to the previously described scenario, the processing system may perform the determination of the state of the traffic light periodically to obtain the current state of the traffic light and provide corresponding instructions to control the vehicle.

In some instances, the processing system may identify a traffic indicator along the road in which the autonomous vehicle is travelling. In some cases, the identified traffic indicator might represent one or more rules that vehicles on the road must comply with. The processing system may provide instructions to alter the vehicle's speed or direction or, in some cases, modify the vehicle's path to abide by rules conveyed by an identified traffic indicator. As an example, the processing system may identify that a traffic indicator is a "STOP" sign based on determining that its color is red and that its shape is an octagon with a high level of confidence. In this example, the processing system may provide instructions to slow the vehicle to a stop. In some cases, the processing system may also identify text or symbols to aid in the classification of the traffic indicator. For instance, the processing system may modify the speed in which the autonomous vehicle is travelling responsive to identifying a traffic indicator that specifies a speed limit.

Although the scenario of FIG. 3A depicts an autonomous vehicle 302, a traffic light 306, and an intersection, other objects may be present that may or may not influence the operation of the autonomous vehicle. In some scenarios, the autonomous vehicle may be configured to perform other methods or processes in conjunction with the methods to detect a traffic light in the present application. These other methods or processes may determine the vehicle's location, speed, and the presence of objects sensed near the vehicle, among others, and may modify the operation of the autonomous vehicle based on those determinations.

Figure 3B:
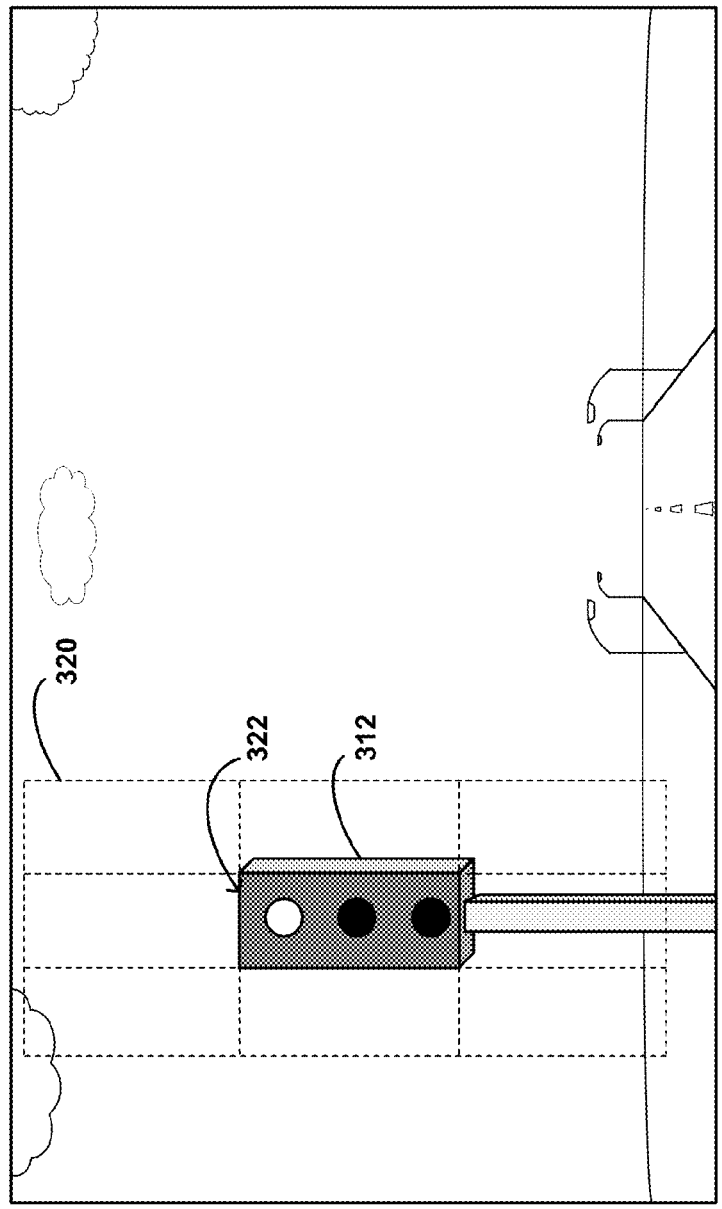
FIG. 3B illustrates an example image including a traffic light.

FIG. 3B, FIG. 3C, and FIG. 3D illustrate example images captured by a camera or other image-capture device coupled to an autonomous vehicle, such as vehicle 302 in the scenario depicted in FIG. 3A. The example images depict background elements, such as a road, street lamps, and clouds. It should be noted that the example images of FIG. 3B, FIG. 3C, and FIG. 3D serve merely as an illustration, and that other elements in the background may be present in other captured images. Additionally, the examples images depicted in FIG. 3B, FIG. 3C, and FIG. 3D depict an image captured within a close range of the traffic light; however, the method of the present application may be applied to an image captured at a further distance from the traffic light, so that the traffic light would appear smaller in the captured image. The example scenarios shown in FIG. 3B, FIG. 3C, and FIG. 3D serve merely as an illustration and may vary in different scenarios.

The traffic lights depicted in FIG. 3B, FIG. 3C, and FIG. 3D have three lighting elements arranged vertically. In the depicted examples, a black filled-in lighting element indicates that the lighting element is off and not illuminating light. A white filled-in lighting element indicates that the lighting element is on and illuminating light. In some instances, a portion of a lighting element may have both black and white portions, indicating a particular shape of the illuminated portion of the lighting element. For the purposes of explanation, and not to limit the scope of the present application, the top lighting element will be referred to herein as the "red light," the middle lighting element will be referred to herein as the "yellow light," and the bottom lighting element will be referred to herein as the "green light." Other traffic light configurations and colors may be received in an image depending upon, for example, the particular geographical region the vehicle is in. It should also be noted, while the housing enclosing the lighting elements is depicted as gray, the housing may be black, white, or another color depending on the particular geographical region the vehicle is in.

The methods of the present application may be carried out by a computer system, an image processing system, or a dedicated processing system coupled to an autonomous vehicle. For the purposes of explanation, and not to limit the scope of the present application, the following descriptions for FIG. 3B, FIG. 3C, and FIG. 3D will describe the methods of the present application being performed by a "processing system."

FIG. 3B illustrates an example image 310 containing a traffic light 312 with an illuminated solid red light. The example image 310 depicts an image portion 320 divided up into a grid of sub-areas. The image portion 320 represents a smaller section of the example image that may be processed by the processing system to determine whether or not it contains a traffic light. Note that the example image 310 depicts the image portion 320 as being a particular size, with the center area 322 of the image portion 320 representing an entire traffic light; however, the size of the image portion and its sub-areas may be larger or smaller than depicted, such as the image portions depicted in FIG. 3C and FIG. 3D.

The processing system first determines whether the image portion 320 likely contains a traffic light. In some embodiments, the processing system calculates a sub-score for the center area 322 and a sub-score for the area surrounding the center area 322 in image portion 320. In some cases, the score may be determined based on the color contained in the sub-areas of image portion 320. In other cases, the score may be determined using a machine-learning technique that involves comparing the sub-areas to example traffic lights, and providing a sub-score proportionate to a confidence level that a given sub-area represents a traffic light. In determining the score, the processing system may utilize example traffic lights that are not necessarily in the same state as the traffic light 312, so that the score does not necessarily correlate to a particular state of the traffic light 312. Rather, a high score may indicate that the sub-area likely contains some traffic light, although the particular state of the traffic light may not be determined. The processing system then determines a score for the image portion 320 as the difference between the sub-score for the center area 322 and the outer areas of image portion 320. In the example image 310, the processing system may determine center area 322 to have a high sub-score and the outer areas to have low sub-scores, such that the result of subtracting the low sub-scores of the outer areas from the high sub-score of the center area 322 is a high score.

The processing system may then compare the score of the image portion 320 with a threshold score (which may also be referred to herein as a "threshold level of confidence") to determine whether or not the image portion 320 is likely to contain a traffic light. The threshold score may be a predetermined value that may be adjusted in a variety of ways. For example, a value may be received at a wireless communication system connected to the autonomous vehicle that modifies the threshold score. In another example, the threshold score may be raised or lowered depending on certain environmental conditions that might affect aspects of captured images or videos. If the processing system determines that the score of the image portion 320 exceeds the threshold score, the image portion 320 is considered to be a candidate portion; that is, it is likely that the image portion 320 contains a traffic light. The threshold score may represent a level of confidence that the image portion 320 contains a traffic light, such that a higher threshold score may reduce the number of candidate portions identifies in an image.

The processing system may repeat the calculation of the scores for multiple image portions, and may determine any number of candidate portions from those multiple image portions. In some cases, the processing system divides up the entire image into image portions of a particular size, repeats the scoring process for each of the image portions, and determines a number of candidate portions from those image portions. The particular size of the image portions may be varied based on the vehicle's distance from the traffic light. In other cases, the processing system divides up a smaller part of the image and performs the previously described steps on the smaller part of the image, which may be referred to herein as an "image patch." An image patch may contain fewer image portions than an entire captured image, such that the image processing may identify the candidate portions in a shorter time. In some cases, the image patch may be determined using certain object recognition techniques to identify a traffic light or traffic indicator. In other cases, the autonomous vehicle may receive, or have stored on a memory, data indicating geographic locations, heights, and orientation of traffic lights. In these cases, the image patch may be determined based on the known locations of the traffic lights in conjunction with a known location of the autonomous vehicle. The location of the autonomous vehicle may be determined from a GPS sensor coupled to the vehicle, for example.

In some instances, if the processing system does not identify any candidate portions from an image patch, the processing system may perform the processing to identify candidates from the entire captured image.

In the example image 310, the processing system may determine the image portion 320 to be a candidate portion. Then, the processing system classifies the candidate portion as either a traffic light in a particular state or as something other than a traffic light. The processing system may provide instructions to control the autonomous vehicle corresponding to the classified traffic light's state. As one example, if the processing system classifies a candidate portion as a traffic light with its red light illuminated, the processing system may provide instructions to stop the autonomous vehicle. As another example, if the processing system classifies a candidate portion as a traffic light with a green left arrow, the processing system may provide instructions to adjust the vehicle's speed and direction to maneuver the vehicle through an intersection. Other instructions may be provided depending on the classified state of the traffic light.

In some cases, the processing system compare the candidate portions against training data representative of images containing traffic lights or traffic indicators to classify a particular traffic indicator based on its color, shape, and text or symbols that may be present on the traffic indicator. The training data may also include example images that do not contain traffic lights. The text or symbols may be identified similarly to the machine-trained classifiers described above, or may use an alternative form of character recognition. Training data may vary depending on the current geographical location of the autonomous vehicle. In some geographical locations, traffic indicators may include one or more mechanical elements that move or otherwise change the appearance of the indicator; thus, the processing system may determine the state of a particular traffic indicator periodically to identify possible changes in the appearance of the indicator.

The processing system may determine whether the candidate portion is similar to example traffic light images that are all in the same state. For example, the processing system may determine whether the candidate portion represents a traffic light with the red light illuminated by comparing the candidate portion to example traffic lights having illuminated red lights. A variety of machine learning techniques may be performed that results in a statistical classification of the candidate portion. In the example, the processing system may determine the candidate portion to represent a traffic light with the red light illuminated with some level of confidence. The processing system may determine that the candidate portion indeed represents a traffic light with the red light illuminated if the level of confidence exceeds some threshold level of confidence. It should be noted that the classifier discussed above may be any mathematical function or machine-learning data structure that maps data of an image to a particular category. The confidence levels may also be determined using a variety of statistical models in order to achieve a desired result.

The processing system may perform the above-described classification on a plurality of candidate portions. Candidate portions that are classified as something other than a traffic light may be referred herein to as a "negative detection." In other words, if a candidate portion is determined to not be a traffic light by the classifier, it is considered a negative detection. Otherwise, if a candidate portion is classified as a traffic light, the candidate portion may be referred to herein as a "positive detection." In some examples, the processing system is configured to identify some negative detections so that the processing system does not ignore potential positive detections.

In some cases, there may be a number of positive detections, indicating that multiple traffic lights are detected in a captured image. The processing system may determine which of the detected traffic lights is nearest to the autonomous vehicle. For instance, the processing system may perform image processing to determine which of the traffic lights appears largest in the captured image. In some implementations, the processing system may provide instructions to control the vehicle based on the state of the traffic light nearest to the autonomous vehicle. If more than one traffic light is detected and classified in the captured image, the processing system may provide instructions to control the vehicle based on the states of multiple traffic lights. For instance, an intersection may have multiple traffic lights directing the flow of traffic across multiple lanes, and the processing system may consider the state of each traffic light in determining the instructions to provide to control the vehicle.

In some instances, the processing system determines a length of time since the instructions to control the vehicle were last provided, and repeats the process of identifying and classifying portions of a captured image if the length of time exceeds a threshold length of time. Thus, the processing system may identify changes in the state of the traffic light, and accordingly may provide appropriate instructions to control the vehicle corresponding to the newly determined state of the traffic light.

The autonomous vehicle may have other sensors and computing systems that perform various methods that also influence or control the autonomous vehicle's speed and direction. In some cases, certain instructions to control the vehicle resulting from other determinations may have a higher priority over the instructions provided by the processing system of the present application. In other cases, instructions provided by the processing system to control the autonomous vehicle are considered among other instructions by a computing device, which may consider the state of a traffic light among other factors—such as weather, objects on the road, pedestrians, and other vehicles, to name a few—when controlling the speed and direction of the vehicle.

An autonomous vehicle may include a wireless communication system configured to send and receive data. The wireless communication system may receive data for modifying or updating aspects of the method, such as the training data described above.

It should be noted that the description above with respect to FIG. 3B describes identification and classification of traffic lights; however, other traffic indicators, such as pedestrian lights and traffic signs, may be identified and classified in a similar manner as traffic lights as described above.

FIG. 3C illustrates another example image 330 containing a traffic light 332 with an illuminated solid red light. The example image 330 depicts an image portion 340 divided into a grid of sub-areas, similarly to the image portion 320 previously described. Note that the example image 330 depicts an image portion 340 as being a particular size, with the center area 342 of the image portion 340 primarily representing the illuminated component of the traffic light.

The processing system may determine whether the image portion 340 likely contains an illuminated component of a traffic light. In some embodiments, the processing system calculates a sub-score for the center area 342 and a sub-score for the area surrounding the center area 342 in image portion 340. In some cases, the score may be determined based on the color contained in the sub-areas of image portion 340. Certain colors may correspond to higher sub-scores, in some cases. For instance, the expected colors of a traffic light—such as a specific green, yellow, and red—correspond to higher sub-scores than other colors. The processing system then determines a score for the image portion 340 as the difference between the sub-score for the center area 342 and the outer areas of image portion 340. In the example image 330, the processing system may determine center area 342 to have a high sub-score and the outer areas to have low sub-scores, such that the result of subtracting the low sub-scores of the outer areas from the high sub-score of the center area 342 is a high score. The processing system may then determine whether the image portion 340 is a candidate portion based on the determined score and a threshold score as previously described.

In some embodiments, calculating the sub-scores involves determining a value for each pixel within a sub-area and adding up all of the determined values. If a particular pixel has a color that is the same or close to an expected traffic light color, the pixel may be assigned a high value. A pixel that is different from an expected traffic light color may be assigned a low value. A color that is close to an expected traffic light color have values in a particular color space that are close to the color values of an expected traffic light color. Thus, a sub-area having many pixels that have colors that are the same or similar to an expected traffic light is determined to have a high sub-score.

In some embodiments, the processing system may verify that at least one pixel from within a candidate portion produces a high value. If the processing system determines that no pixels within the image correspond to a value exceeding some threshold value, the processing system may consider the candidate portion to be a negative detection. In some cases, a candidate portion may have a relatively high score as a result of most of the pixels producing a moderately high value. In these cases, if no single pixel corresponds to a high value, it is unlikely that the candidate portion represents an illuminated component of a traffic light.

In some instances, the processing system may also consider the luminance of the pixels when determining the sub-scores. Pixels having higher luminance may correspond to higher values in some cases. As an example, an object emitting light may be captured by a camera, and the object in the captured image may have a higher luminance compared to other objects that are merely reflecting light.

It should be noted that the expected colors of a traffic light might vary depending on the particular geographical region in which the autonomous car is travelling. In some cases, the autonomous vehicle selects a set of expected colors to correspond with high sub-scores based on the vehicle's current geographical location.

If the processing system determines image portion 340 as a candidate image, the processing system may then classify the image portion 340 similarly to the classification previously described with respect to FIG. 3B. The center area 342 may be compared to example illuminated components of traffic lights in order to determine the particular state of the traffic light. The classification may be performed using any machine-learning techniques that perform a statistical classification. In the depicted example image 330, the processing system may determine the traffic light 332 to have a solid red light with a high level of confidence as a result of the classification. Other traffic light states represented by particular colors and shapes may be determined in other instances.

In some embodiments, the processing system may divide an image portion into a center area, a middle area, and an outer area. The middle area may extend from the outer edge of the center area to the inner edge of the outer area. The processing system may perform the scoring similarly to the previously described scoring by subtracting the sub-score of the outer area from the sub-score of the center area. However, the processing system may ignore the middle area, so that there is a non-scored area separating the center area and the outer area. Although the image patch 340 is divided such that the center area primarily encloses the illuminated component of the traffic light, other image patches may provide such an ideal division. In some cases, the illuminated component of the traffic light may extend beyond the center area into the outer area, resulting in a reduced score for the image patch despite the image patch containing an illuminated component of a traffic light. By ignoring the middle area, the processing system may more consistently produce high scores for image portions that contain an illuminated portion of a traffic light despite non-ideal proportioning of the image portion sub-areas.

FIG. 3D illustrates an example image 350 containing a tree 352. In the example image 350, the tree 352 has plurality of green leaves that are similar in color to an expected color of a green lighting component of a traffic light. The processing system may determine a high sub-score for the center area 362 as a result of the similarity in color to the green traffic light. However, in this example, the processing system may also determine a high sub-score for the outer area of the image portion 360 as a result of the outer area also containing the green leaves. Thus, the processing system may subtract the sub-score of the outer area from the sub-score of the center area and determine the score of the image portion 360 to be low, even though the expected green color was present in sub-areas of the image portion 360. Then, the processing system may determine that the low score of image portion 360 is below the threshold score and that the image portion 360 is not considered a candidate portion. Because the image portion 360 is not considered a candidate portion, the processing system does not perform the processing to classify the image portion 360.

It should be noted that the methods carried out by the processing system may be performed to identify and classify any traffic light, light indicator (such as a pedestrian light or a grade crossing light), or traffic indicator (such as road signs and signposts). The training data discussed above may be updated or otherwise modified to apply the method to classify various indicators associated with directing traffic flow of vehicles and pedestrians.

Figure 4:
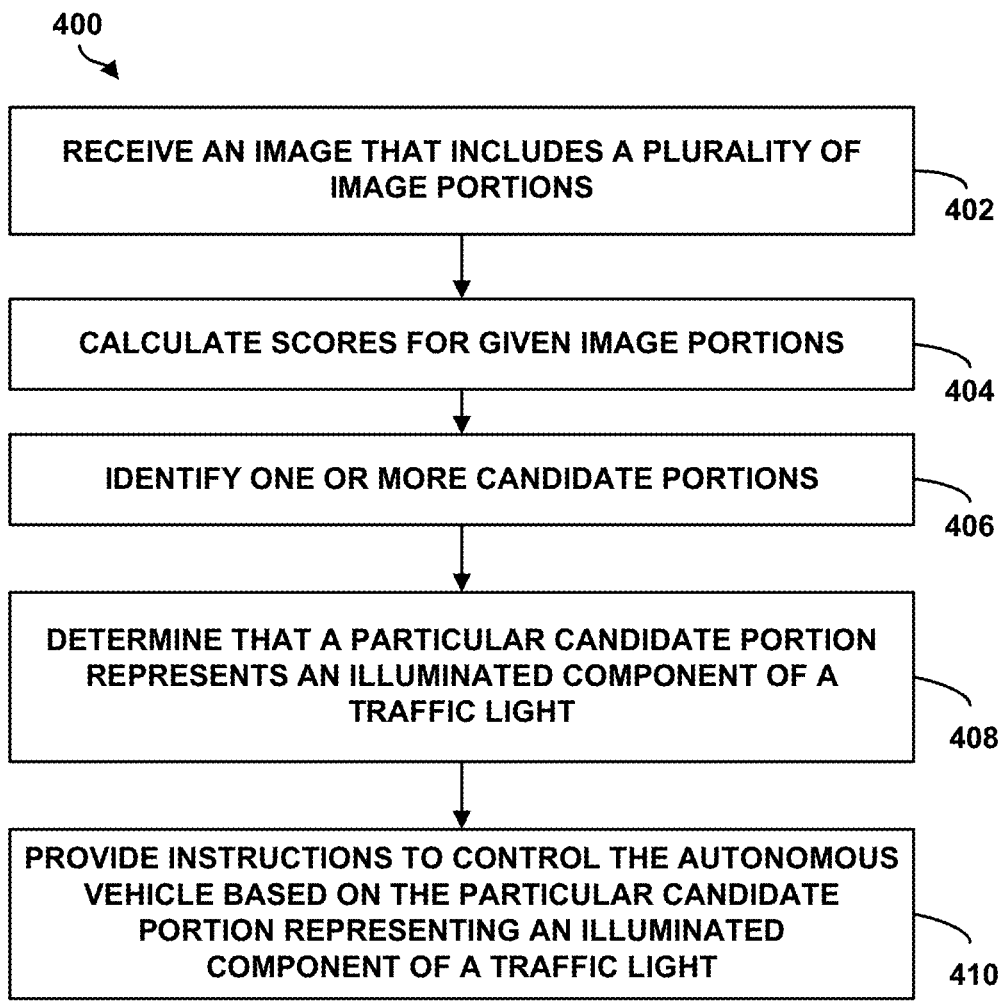
FIG. 4 is a flowchart of an example method.

FIG. 4 illustrates an example method 400 for real-time image-based traffic light detection and classification. A method 400 is provided for real-time image-based traffic light detection and classification for an autonomous vehicle. The method could be performed to detect and classify traffic lights or other light indicators associated with directing traffic flow of cars and pedestrians in the captured images and videos, similar to what was described with respect to FIG. 3A, FIG. 3B, FIG. 3C, and FIG. 3D; however, the method 400 is not limited to the scenarios shown in FIG. 3A, FIG. 3B, FIG. 3C, and FIG. 3D. FIG. 4 illustrates the blocks in an example method for real-time image-based turn traffic light detection and classification for the autonomous vehicle. However, it is understood that in other embodiments, the blocks may appear in different order and blocks could be added, subtracted, or modified. Additionally, the blocks may be performed in a linear manner (as shown) or may be performed in a parallel manner (not shown).

Block 402 includes receiving an image that includes a plurality of portions. As previously discussed, the autonomous vehicle includes a camera. In some embodiments, a camera is configured to capture either still images or videos from the vehicle that include a light indicator. The camera stores the captured images or videos in a memory. At block 402, the processing system may receive the captured images or videos from the memory. In additional embodiments, the processing system may receive images or videos directly from the camera. In either of the configurations, the processing system receives data representative of images or videos for processing. If the received data corresponds to a video, a single frame may be extracted from the video to be processed. Additionally, multiple frames of a video may be analyzed sequentially or in parallel.

The image received at block 402 may be similar to the example images shown in FIG. 3B, FIG. 3C, and FIG. 3D. The camera may capture the image using a variety of settings, such as a particular shutter speed and exposure, in order to achieve a desired result. Further, the captured images may be filtered, cropped, or otherwise altered before being sent to the processing system for classification.

Block 404 includes calculating scores for given image portions. The calculated scores indicate a level of confidence that a given image portion represents an illuminated component of a traffic light. As discussed above, the scoring involves calculating sub-scores for the outer area of the given image portion and the center area of the given image portion. The sub-scores may indicate that a sub-area contains a certain color, or may indicate a confidence level determined using machine learning tools. A difference between the sub-score for the outer area and the sub-score for the center area is used to determine the score for the given image portion. Determining a difference between the sub-scores may involve subtracting the sub-score for the outer area from the sub-score for the center area.

Block 406 includes identifying one or more candidate portions from among the plurality of image portions. The image portions having scores that exceed a threshold level of confidence are considered candidate portions. The candidate portions are considered to potentially contain an illuminated component of a traffic light. Further processing, as described below, is used to determine which candidate portions, if any, contain an illuminated component of a traffic light and which do not.

Block 408 includes determining that a particular candidate portion represents an illuminated component of a traffic light. This may involve determining a shape and color of the illuminated component of the traffic light. A classifier may be used in order to determine the shape and color of the illuminated component of the traffic light. The classifier may compare the candidate portion to example images of illuminated components of traffic lights having certain shapes and colors. The classifier may determine that the particular candidate portion represents a particular colored and shaped illuminated component of a traffic light, such as a solid red light, a left arrow green light, or a yellow light, among other examples. The classifier may also determine a confidence level associated with a particular classification. In some cases, the classifier determines that the particular candidate portion represents an illuminated component of a traffic light in a particular state if the confidence level exceeds some threshold level of confidence.

Block 410 includes providing instructions to control an autonomous vehicle based on the particular candidate portion representing an illuminated component of a traffic light. In some embodiments, the state of the traffic light may be determined from the illuminated component of the traffic light. The instructions to control the autonomous vehicle may correspond to the determined state of the traffic light.

In some instances, the instructions may be provided to a control system of an autonomous vehicle. The instructions may correspond to navigating the vehicle along a particular path and a manner in which the vehicle travels along the particular path. The control system may cause the vehicle to travel along the particular path in the determined manner by adjusting the throttle, brake, steering, and other systems that influence the speed and direction of the vehicle. The control system may modify the vehicle's translational velocity, rotational velocity, or both based on the provided instructions. One or more instructions may correspond to determined states of traffic lights. In some instances, the particular instruction provided to the control system is influenced by the speed and direction in which the vehicle is traveling, in addition to the determined states of traffic. In various embodiments, the state of the traffic light may influence the operation of the autonomous vehicle, along with other factors such as objects near the vehicle.

In some embodiments, the disclosed methods may be implemented as computer program instructions encoded on a computer-readable storage media in a machine-readable format, or on other non-transitory media or articles of manufacture. FIG. 5 illustrates an example computer readable medium in the form of a computer program product 500 that includes a computer program for executing a computer process on a computing device, arranged for real-time image-based traffic light detection and classification. In one embodiment, the example computer program product 500 is provided using a signal bearing medium 501. The signal bearing medium 501 may include one or more program instructions 502 that, when executed by one or more processors (e.g., processor 113 in the computing device 111) may provide functionality or portions of the functionality described above with respect to FIGS. 1-4. Thus, for example, referring to the embodiments shown in FIG. 4, one or more features of blocks 402-412 may be undertaken by one or more instructions associated with the signal bearing medium 501. In addition, the program instructions 502 in FIG. 5 describe example instructions as well.

In some examples, the signal bearing medium 501 may encompass a computer-readable medium 503, such as, but not limited to, a hard disk drive, a Compact Disc (CD), a Digital Video Disk (DVD), a digital tape, memory, etc. In some implementations, the signal bearing medium 501 may encompass a computer recordable medium 504, such as, but not limited to, memory, read/write (R/W) CDs, R/W DVDs, etc. In some implementations, the signal bearing medium 501 may encompass a communications medium 505, such as, but not limited to, a digital and/or an analog communication medium (e.g., a fiber optic cable, a waveguide, a wired communications link, a wireless communication link, etc.). Thus, for example, the signal bearing medium 501 may be conveyed by a wireless form of the communications medium 505 (e.g., a wireless communications medium conforming to the IEEE 802.11 standard or other transmission protocol).

The one or more programming instructions 502 may be, for example, computer executable and/or logic implemented instructions. In some examples, a computing device such as the computing device described with respect to FIGS. 1-4 may be configured to provide various operations, functions, or actions in response to the programming instructions 502 conveyed to the computing device by one or more of the computer readable medium 503, the computer recordable medium 504, and/or the communications medium 505. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A method comprising:
   receiving, from an image-capture device coupled to an autonomous vehicle, an image of a field of view of the autonomous vehicle, wherein the image comprises a plurality of image portions;
   calculating, for each given image portion, a respective score indicating a level of confidence that the given image portion represents an illuminated component of a traffic light, wherein calculating the respective score for the given image portion comprises identifying at least one area within the given image portion and determining color values and luminance values of pixels in the at least one area;
   identifying, from among the plurality of image portions, one or more candidate portions as image portions having a score exceeding a threshold level of confidence;
   determining, using a classifier, that a particular candidate portion represents an illuminated component of a traffic light, wherein the classifier has been trained using training data indicative of a plurality of example images that include traffic lights and a plurality of example images that do not include traffic lights; and
   based on the particular candidate portion representing an illuminated component of a traffic light, providing instructions executable by a computing device to control the autonomous vehicle.

2. The method of claim 1, wherein identifying at least one area within the given image portion comprises identifying at least a first area within the given image portion and a second area within the given image portion.

3. The method of claim 2, wherein the first area is a center area within the given image portion and the second area is an area surrounding the first area.

4. The method of claim 2, wherein calculating the respective score for the given image portion further comprises:
   calculating a first sub-score based on color values and luminance values of pixels in the first area; and
   calculating a second sub-score based on color values and luminance values of pixels in the second area.

5. The method of claim 4, wherein calculating the respective score for the given image portion further comprises determining a difference between the second sub-score and the first sub-score.

6. The method of claim 4, wherein calculating a first sub-score based on color values and luminance values of pixels in the first area comprises:
   determining, for each pixel in the first area, a respective pixel color and assigning a respective color value based on a similarity between the respective pixel color and an expected traffic light color, so as to determine a plurality of color values;
   determining, for each pixel in the first area, a respective pixel luminance and assigning a respective luminance value based on the respective pixel luminance, so as to determine a plurality of luminance values; and
   calculating the first sub-score based on the determined color values and the determined luminance values.

7. The method of claim 3, wherein identifying at least one area within the given image portion further comprises identifying a third area within the given image portion, wherein the third area is located between the first area and the second area.

8. An image processing system comprising:
   an image-capture device;
   at least one processor; and
   a memory having stored thereon instructions that, upon execution by the at least one processor, cause the image processing system to perform functions comprising:
      receiving, from the image-capture device coupled to an autonomous vehicle, an image of a field of view of the autonomous vehicle, wherein the image comprises a plurality of image portions;
      calculating, for each given image portion, a respective score indicating a level of confidence that the given image portion represents an illuminated component of a traffic light, wherein calculating the respective score for the given image portion comprises identifying at least one area within the given image portion and determining color values and luminance values of pixels in the at least one area;
      identifying, from among the plurality of image portions, one or more candidate portions as image portions having a score exceeding a threshold level of confidence;
      determining that a particular candidate portion represents an illuminated component of a traffic light based on training data indicative of a plurality of example images that include traffic lights and a plurality of example images that do not include traffic lights; and
      based on the particular candidate portion representing an illuminated component of a traffic light, providing executable instructions to control the autonomous vehicle.

9. The image processing system of claim 8, wherein identifying at least one area within the given image portion comprises identifying at least a first area within the given image portion and a second area within the given image portion.

10. The image processing system of claim 9, wherein the first area is a center area within the given image portion and the second area is an area surrounding the first area.

11. The image processing system of claim 9, wherein calculating the respective score for the given image portion further comprises:
    calculating a first sub-score based on color values and luminance values of pixels in the first area; and
    calculating a second sub-score based on color values and luminance values of pixels in the second area.

12. The image processing system of claim 11, wherein calculating the respective score for the given image portion further comprises determining a difference between the second sub-score and the first sub-score.

13. The image processing system of claim 11, wherein calculating a first sub-score based on color values and luminance values of pixels in the first area comprises:
    determining, for each pixel in the first area, a respective pixel color and assigning a respective color value based on a similarity between the respective pixel color and an expected traffic light color, so as to determine a plurality of color values;
    determining, for each pixel in the first area, a respective pixel luminance and assigning a respective luminance value based on the respective pixel luminance, so as to determine a plurality of luminance values; and
    calculating the first sub-score based on the determined color values and the determined luminance values.

14. The image processing system of claim 10, wherein identifying at least one area within the given image portion further comprises identifying a third area within the given image portion, wherein the third area is located between the first area and the second area.

15. A non-transitory computer-readable medium having stored thereon instructions that, upon execution by at least one processor of a computing device, cause the computing device to perform functions comprising:

receiving, from an image-capture device coupled to an autonomous vehicle, an image of a field of view of the autonomous vehicle, wherein the image comprises a plurality of image portions;

calculating, for each given image portion, a respective score indicating a level of confidence that the given image portion represents an illuminated component of a traffic light, wherein calculating the respective score of the given image portion comprises identifying at least one area within the given image portion and determining color values and luminance values of pixels in the at least one area;

identifying, from among the plurality of image portions, one or more candidate portions as image portions having a score exceeding a threshold level of confidence;

determining, using a classifier, that a particular candidate portion represents an illuminated component of a traffic light, wherein the classifier has been trained using training data indicative of a plurality of example images that include traffic lights and a plurality of example images that do not include traffic lights; and based on the particular candidate portion representing an illuminated component of a traffic light, providing instructions executable by the computing device to control the autonomous vehicle.

16. The non-transitory computer-readable medium of claim 15, wherein identifying at least one area within the given image portion comprises identifying at least a first area within the given image portion and a second area within the given image portion.

17. The non-transitory computer-readable medium of claim 16, wherein the first area is a center area within the given image portion and the second area is an area surrounding the first area.

18. The non-transitory computer-readable medium of claim 16, wherein calculating the respective score for the given image portion further comprises:

calculating a first sub-score based on color values and luminance values of pixels in the first area; and calculating a second sub-score based on color values and luminance values of pixels in the second area.

19. The non-transitory computer-readable medium of claim 18, wherein calculating the respective score for the given image portion further comprises determining a difference between the second sub-score and the first sub-score.

20. The non-transitory computer-readable medium of claim 18, wherein calculating a first sub-score based on color values and luminance values of pixels in the first area comprises:

determining, for each pixel in the first area, a respective pixel color and assigning a respective color value based on a similarity between the respective pixel color and an expected traffic light color, so as to determine a plurality of color values;

determining, for each pixel in the first area, a respective pixel luminance and assigning a respective luminance value based on the respective pixel luminance, so as to determine a plurality of luminance values; and calculating the first sub-score based on the determined color values and the determined luminance values.

* * * * *